United States Patent
Aisa

(10) Patent No.: US 7,383,985 B1
(45) Date of Patent: Jun. 10, 2008

(54) HOUSEHOLD ELECTRIC USER HAVING AN ELECTRONIC CONTROL, AND CONTROL AND PROGRAMMING SYSTEM THEREOF

(75) Inventor: Valerio Aisa, Fabriano (IT)

(73) Assignee: Wrap, SpA, Fabriano (IT)

( * ) Notice: Subject to any disclaimer, the term of this patent is extended or adjusted under 35 U.S.C. 154(b) by 0 days.

(21) Appl. No.: 10/110,250

(22) PCT Filed: Feb. 1, 2000

(86) PCT No.: PCT/IB00/00094

§ 371 (c)(1),
(2), (4) Date: Apr. 10, 2002

(87) PCT Pub. No.: WO01/28067

PCT Pub. Date: Apr. 19, 2001

(30) Foreign Application Priority Data

Oct. 13, 1999 (IT) ............................. TO99A0888

(51) Int. Cl.
*G06F 7/00* (2006.01)
(52) U.S. Cl. ...................... 235/376; 235/375
(58) Field of Classification Search ............... 235/375, 235/376, 385, 419, 420, 436, 439, 440; 219/506, 219/702, 704, 714; 700/1, 19, 65, 90; 702/80; 704/270
See application file for complete search history.

(56) References Cited

U.S. PATENT DOCUMENTS

| | | | | |
|---|---|---|---|---|
| 4,375,586 A * | 3/1983 | Ueda | ........................... | 219/714 |
| 4,573,325 A * | 3/1986 | Chiu et al. | ..................... | 62/129 |
| 4,628,439 A * | 12/1986 | Fowler et al. | ................. | 700/9 |
| 4,914,277 A * | 4/1990 | Guerin et al. | ............... | 219/506 |
| 5,352,874 A * | 10/1994 | Gong | ........................... | 219/704 |
| 5,583,770 A | 12/1996 | Sekido et al. | | |
| 5,699,243 A * | 12/1997 | Eckel et al. | ................... | 700/17 |
| 5,717,870 A * | 2/1998 | Dobson | ...................... | 709/250 |
| 5,867,809 A * | 2/1999 | Soga et al. | .................. | 702/130 |
| 6,137,095 A * | 10/2000 | Kashimoto et al. | ......... | 219/702 |
| 6,444,965 B1 * | 9/2002 | Ha et al. | ..................... | 219/702 |
| 6,522,659 B2 * | 2/2003 | Anzai | .......................... | 370/442 |
| 6,532,195 B1 * | 3/2003 | Head | ........................... | 368/64 |
| 6,557,756 B1 * | 5/2003 | Smith | .......................... | 235/379 |

(Continued)

FOREIGN PATENT DOCUMENTS

DE 4004097 A1 8/1991

(Continued)

*Primary Examiner*—Thien M. Le
*Assistant Examiner*—Kumiko C Koyama
(74) *Attorney, Agent, or Firm*—Cesari and McKenna, LLP; Patricia A. Sheehan

(57) ABSTRACT

A household electric user includes an electronic control system that contains an electronic microcontroller (MC), a read and write non volatile memory means (MNV), and means (MC,MS,A1-A5,MZ) for detecting and/or generating variables which relate to the operation status of the electric user. The control system automatically records, within the non volatile memory means (MNV), information of a first type that is indicative of the temporal trend of the status variables during successive predefined reference periods, with the last stored information of the first type causing the elimination of the oldest such information, i.e. with a backward shifting operation of the stored information of the first type. The control system further allows the stored information of the first type to be read outside of the electric user.

28 Claims, 1 Drawing Sheet

U.S. PATENT DOCUMENTS 6,728,679 B1 * 4/2004 Strubbe et al. .......... 704/270.1

FOREIGN PATENT DOCUMENTS

| | | | |
|---|---|---|---|
| EP | 0727860 | A1 | 2/1996 |
| JP | 06339225 | A | 12/1994 |
| JP | 07015871 | A | 1/1995 |
| WO | WO 99/43068 | | 8/1999 |

* cited by examiner

HOUSEHOLD ELECTRIC USER HAVING AN ELECTRONIC CONTROL, AND CONTROL AND PROGRAMMING SYSTEM THEREOF

BACKGROUND OF THE INVENTION

1. Field of the Invention

The present invention relates to a household electric user having an electronic control, and to a control and programming system thereof.

2. Background Information

It is known that the components of certain household electric users, such as household appliances, are subject to wear and occasional faults and that in consequence of such faults repair operations are required in daily practice.

It is also known that some household appliances may be equipped with a sophisticated electronic control system, which is capable of identifying the nature of some type of malfunctions and signal them appropriately, so as to ensure a subsequent easier repair operation.

For instance, from document WO9943068, to which reference can be made for more details, a set of household appliances connected in a network is disclosed, where such appliances are programmed for generating information of various type, which are useful for the person using the appliance (hereinafter referred to as "consumer") and/or the serviceman called for maintenance or technical service of such appliances.

According to the system described in the above document a special monitoring device is connected to the network for collecting from it, and partially store, information that each appliance is in a position to generate, namely:
a) functional information, i.e. relating to the current operating mode of the household appliance;
b) diagnostic information. i.e. relating to the efficiency status of determined mechanical and electrical components of the household appliance;
c) statistical information, i.e. relating to operating statistical data of the household appliance, which therefore indicate the wear status of the above mechanical and electrical components.

As a result, through the above monitoring device, the consumer is in the condition of checking from one sole location in the home, and by virtue of said functional information, the operating status of all household appliances connected to the network; the monitoring device also has the important function of facilitating the technical servicing of the appliances, through the availability of the diagnostic and statistical data generated by the appliances and stored by the monitoring device itself, which can be accessed by the maintenance and service personnel.

According to the solution described in WO9943068, the information under point c) consist of data being essentially statistical relating to the appliance operation, which therefore form a sort of "summary" of the activity performed of the appliance, in terms of operations and/or function carried out and in terms of mode of use by the consumer, since its installation date.

For instance, in the case of a laundry washing machine, the statistical information provided by WO9943068 refer to the total number and/or the type of wash cycles selected by the consumer, the number of washings associated to the various types of fabric, the quantity of clothes washed on average for each type of fabric, the wash temperatures and the spinning speeds selected by the consumer on average, the water hardness mean value, the number of rinses on average, etc.

Therefore, the above statistical data are represented by simple absolute or mean values, which are gradually updated in time by the appliance control system; it is in fact clear how, for instance, following the continuous use of the washing machine, statistical data such as the total number of wash cycles executed, the total number of washes associated to a specific fabric type, the mean value of the wash temperature, the mean quantity of washed clothes, the mean value of the water hardness, and so on, will be continuously amended and updated in the time.

The above statistical information are very useful, due to their specific nature, to give indications on the wear status of the various components of the appliance and to a certain extent make the maintenance operations easier, especially in view of its preventive maintenance; however, such information have the drawback of being "aggregated" information, i.e. they consist of data that cannot supply detailed indications and which cannot, consequently, be interpreted and used for the purposes of identifying exactly and directly the origin of a malfunction and/or fault of the household appliance.

To this effect, it should be pointed out that also diagnostic information as mentioned above under point b) may not be sufficient to that purpose.

In fact, although said diagnostic information are provided for giving indication on the efficiency status of certain internal components of a household appliance, they are anyway always expressed by the value of a predefined set of typical operating parameters of the household appliance itself, and therefore they are unable to reflect all possible malfunction and/or fault cases (for example, in the case of a freezer, typical diagnostic information relate to the number of times the preservation temperature reached values being less colder than a preset value, the number of power mains blackouts, the number of times a compressor protector operated, etc.).

Therefore, in other terms, also the diagnostic information provided by WO9943068, surely useful for a fast analysis of specific operating alterations of the appliance, are not useful for detecting other and different types of faults or malfunctions.

SUMMARY OF THE INVENTION

The present invention has the purpose of solving the above drawbacks of the previously mentioned state of the art.

Within this frame, it is an aim of the present invention to provide an electric user having an electronic control system which is realized and programmed for generating and storing, preferably in a non volatile memory, but which can be updated, information being more detailed than provided so far by the present state of the art, and making such information available to the serviceman called for repair and/or maintenance operations to the appliance itself.

Another aim of the present invention is to provide a control and programming system for such an electric user, having a structure being particularly advantageous for the above purposes.

These and other aims that will become apparent in the following are obtained according to the present invention by means of a household electric user having an electronic control, and by a control and programming system thereof, incorporating the features of the annexed claims, which form an integral part of the present description.

Further aims, features and advantages of the present invention will become apparent from the following detailed

DETAILED DESCRIPTION OF AN ILLUSTRATIVE EMBODIMENT

Figure 1:
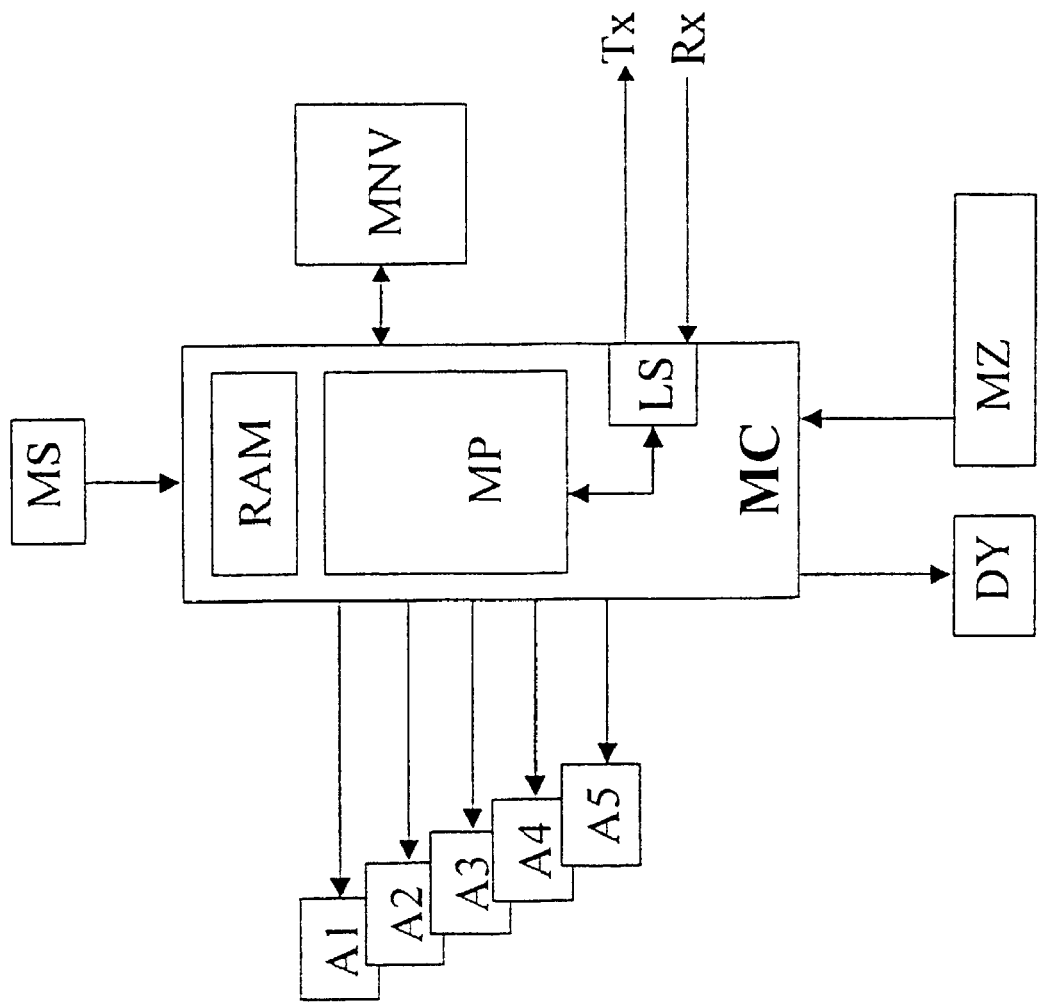
FIG. 1 shows schematically a typical architecture of an electronic control system of an electric user according to the present invention.

The electronic control system of an electric user manufactured according to the teachings of the present invention comprises an electronic microcontroller, indicated with MC, apt for interpreting the instructions supplied by appropriate command means MZ, being present on a control panel of the electric user, and consequently managing the operation of the latter.

To this purpose, the microcontroller MC comprises a volatile memory of the RAM type, indicated with RAM, and a non volatile program memory MP, such as a ROM or Flash memory.

The microcontroller MC is also fitted with a serial line LS, for bi-directional communication with the external environment; a non volatile memory MNV, such as an EEPROM or Flash memory of appropriate capacity is also associated to the microcontroller MC.

In the memory MP are permanently contained both the information relating to the general structure of the operative cycles the electric user is able to perform and the logic governing their execution; i.e., substantially, the control program of the microcontroller MC and the data relating to the operation cycles the electric user can execute.

The above cycles consist in turn of phase or steps featured by determined operation parameters, which relate to the various internal devices of the electric user.

By mere way of example, in the instance of an oven, an operation cycle may be split in an initial pre-heating phase, followed by three or four cooking phases: in the instance of a laundry washing machine, the program may be split in a pre-wash cycle, a wash cycle, a rinse cycle, a spinning and/or drying cycle, where each cycle provides for one or more phases.

The memory MP is preferably protected, so that the information stored therein cannot be modified.

In the memory MP (or eventually in a first area of the memory MNV, preferably a protected one), also the operating parameters are stored, being characteristic of the various phases into which some specific standard cycles of the electric user are subdivided; in other terms, the cited parameters relate to standard cycles, i.e. to the basic programs being available on the electric user at the time of its purchase, which are provided for allowing an immediate use of the appliance.

For instance, such basic programs are the programs traditionally performed by a conventional household appliance; therefore, in the event of an oven apt for the conventional infrared baking, reference is made to the possibility of selecting the baking program by choosing the relevant temperature and eventually the baking duration.

A name is associated to each set of the above operating parameters contained in the memory MP and/or memory MNV, which relate to a determined operating cycle, said name allowing univocal identification of a determined basic program of the electric user, for instance on display means DY, such as a display, provided on the control panel of the electric user.

In the case of an oven, the cited operating parameters may refer the time duration of a phase, the internal temperature of the cooking chamber, the configuration of the heating elements, the availability or not of ventilation and the operating modes that the oven actuators which manage both the heaters and the fans should have during that phase, respectively.

Such actuators, which are controlled by the microcontroller MC according to the selected program, may consist for example by relays and/or triacs and are indicated schematically in FIG. 1 by the respective internal devices of the electric user they manage, with reference numerals A1, A2, A3, A4 and A5.

In the practice, such internal devices may consist, for an oven, of a heater located under the cooking chamber, a heater placed behind the cooking chamber, a grill heater placed inside the cooking chamber, a steam generator, an air circulation fan, etc.; in the case of a washing machine, such internal devices may consist of one or more water heaters, a motor for rotating a drum or a pump impeller, or a drying fan, a detergent dispenser, a pressure switch controlling the water level, etc., in the case of a refrigerating appliance, such internal devices may consist of one or more compressors, a defrost heater, etc.

The control system of FIG. 1 also comprises suitable means for sensing the operating conditions of the electric user, which are indicated globally with MS and are capable of communicating the detected information to the microcontroller MC; for a washing machine, such sensor means may for instance comprise temperature sensors, water hardness sensors, water level sensors, water conductivity sensors, etc.; for a cooking apparatus, such sensor means may comprise one or more temperature sensors, etc.; for a refrigerating appliance, such sensor means may comprise a room temperature sensor, a temperature sensor of the refrigerating cell, a door sensor, etc.

According to the present invention, the microcontroller MC is programmed for generating the following information, similar to the ones already mentioned with reference to WO9943068:

i) Functional Information

These information, as already mentioned, describe the status of the electric user right at the moment the control system is questioned, i.e. they indicate what is being performed by the electric user, what step has been reached in the cycle execution, how long it will take to reach the cycle end, what is the instant or present value of any significant variables of the running cycle (for example, in the case of a washing machine, water temperature, water level and water hardness, etc.), what functions were selected by the consumer, etc.

The functional information reside in the memory RAM of the microcontroller MC of the control system represented in FIG. 1.

ii) Diagnostic Information

These information describe the "performance" level of the electric user. i.e. the operation status of its various parts, such as sensors, actuators, electronic components in general, etc.).

These information are generated by an appropriate self-diagnose program, managed by the microcontroller MC; and likely wrong operating situations of the electric user are described through appropriate fault codes.

The above diagnostic information reside in the non volatile memory MNV of the control system; anyway, the microcontroller MC may also be advantageously programmed for directly signaling, by means of the display DY, certain wrong operating situations of the electric user.

iii) Statistical Information

These information supply statistical data of the "wear" status of the various components of the electric user, which depends upon the product age and number and type of operating cycles executed, as well as of its modes of use, i.e. the consumer's habits in using the electric user.

Statistical information always resided in the non volatile memory MNV of the control system.

As mentioned at the beginning of the present description, the diagnostic and the statistical information may not be sufficient for identifying directly both the nature and the causes of a fault of the electric user.

Therefore, the control system of the electric user according to the present invention, is programmed for generating also detailed historical information.

Such historical information practically consist in the recording of the temporal trend of the variables of status of the electric user, where said temporal trend relates to the last operation period of the electric user and is associated to the likely occurrence of internal events (such as faults and malfunction of components) and/or external events (such as a supply voltage blackout, the door opening in a refrigerator, etc.), which to some extent may alter a correct operation of the electric user itself.

The above concept of "historical information" applies for both the electric users featured by a continuous operation, such as refrigerators, freezers, boilers, etc, and the electric users with discontinuous use, such as laundry washing machines, cooking ovens, dishwashers, etc.

In the first instance, the historical information will practically refer to all events occurred during a determined period taken as a reference (such as a week, a day, the last twelve hours, etc.). In the second instance, vice-versa, the historical information will consist of the detailed description of the last "N" operation cycles performed by the electric user, and the relevant recording of the instants when certain disturbing events have eventually occurred; for instance, in the case of a laundry washing machine, for each of the "N" cycles of reference, the type of selected cycle, the wash temperature, the spinning speed, the type and quantity of washed clothes, the likely voltage mains blackouts, the quantity of detergent used, etc., will be stored.

As it can be appreciated, the availability of the above said detailed historical information, being associated to the last operating period of the electric user (whose length will be appropriately chosen), allows for executing a deep analysis of the electric user operating status, even from a remote location, so that it is possible to immediately go back faster to the causes of a fault.

To this purpose, the detailed historical information always reside in the non volatile memory MNV of the control system and are recorded in a way that the last stored data cause the elimination of the oldest ones, i.e. through a backward shifting operation of the recorded data, this being obtained through the fixing of a determined time interval associated to the last operation period of the power user (expressed, as said above, in terms of time or of "N" operating cycles).

As regards generating the various types of information mentioned above, it should be considered that the microcontroller MC of the electric user control system is programmed for controlling all programs and functions which can be performed by the appliance; therefore, the control system has a complete knowledge of the operating status of the electric user and perfectly knows instant by instant, for example in the case of a refrigerator, whether the relevant electric loads represented by the actuators A1-A5 and the respective internal devices of the appliance (such as compressor, defrost heater, air circulation fan, internal lamp of the refrigerating or freezer compartment, etc.) are activated.

Always in this frame, the microcontroller MC is obviously able to receive the information obtained through the sensors MS of the electric user, such as, for example in the case of a refrigerator, the room temperature (provided the refrigerator is fitted with a sensor for measuring such a value), the temperature of the refrigerating cell, the duration of the door openings and the instant when they have occurred, etc.

Based on the above and provided the microcontroller MC is equipped with its own internal clock, it will be clear how the control system is able to record in a very detailed manner the temporal progress of the variables of status of the electric user according to the invention, i.e. to generate the above historical information which, unlike diagnostic and statistical information, allow for obtaining a really complete situation of the electric user operation in the period which directly precedes the occurring of a fault.

The microcontroller MC has a communication channel to the external environment which, as said above, consists of an asynchronous serial line LS; obviously, such a communication channel may also theoretically consist of a synchronous serial line or a parallel port (even if the latter would be a more expensive solution).

Apart from the means employed, it is obvious how through the above communication channel the microcontroller MC can make available outside the various information being contained, generated and/or stored within its memory means RAM, MP and MNV.

The access procedures from outside to the various information contained in the memory means associated to the microcontroller MC, whose specific protocols are out of consideration from the present invention, can be referable to the following five points:

1. Reading of any location of the memory RAM;
2. Writing of any location of the memory RAM;
3. Reading of any location of the non volatile memory MNV;
4. Writing of any location of the non volatile memory MNV;
5. Total remote control of the electric user which, therefore, may become a simple peripheral (slave) of an electronic external device, such as a Personal Computer, o similar apparatus (master or supervisor).

Therefore, the above five procedures of interaction with the external environment make the electric user with electronic control according to the present invention capable of connection to a network or to any external master or supervisor device, as well as possible the access to Internet through any gateway capable of managing the relevant communication protocol; as to the latter point, access to Internet may be either direct (management of the TCP/IP protocol by the same control system of the electric user) or indirect (through any Internet appliance, such as a suitable modem or PC with modem), and can be done either by cable or wireless connection.

It is clear from the previous points 1) and 3) the possibility of having available, outside the electric user, all the information of different nature which has the electronic control system.

On the other hand, from the above points 2) and 5), it is clear the possibility of submitting the electric user to a total remote control, this consists, as already briefly mentioned, in putting the microcontroller MC in the condition of sending outside, towards a master device (such as a PC) the information read by its various sensors MS, and managing the actuators A1-A5 on the basis of the indications supplied by the above master device, after interpreting said information through an appropriate control program.

Finally, from the above point 4), the possibility is clear of realizing an updating of the value of the parameters associated to the various standard operating modes of the product (basic cycles or programs) and add new operating modes, i.e. new cooking programs, new wash cycles and so on.

In the first instance, the characteristic parameters of the various phases composing the basic cycles or programs of the household electric user may be contained in a first area of the memory MNV (instead of the memory MP), and modifiable through an appropriate electronic device which can be interfaced with the electric user through the line LS; this with the aim of updating said basic operating cycles, for example by modifying some parameters, such as the wash water level, the temperature value associated to a determined cooking program, etc. (preferably, such an activity should be performed by qualified personnel and not directly by the consumer).

In the second instance, on the other hand, an area of the memory MNV may be dedicated for receiving and retaining the characteristic parameters of the various phases pertaining to additional operating cycles, i.e. which are added later to the electric user, upon a request from the consumer and by means of the cited external electronic device, thus creating new operation programs. Obviously, also in this instance, each set of parameters relating to the phases of a determined new cycle eventually stored in the memory MNV, will be associated to a name and/or an order number and/or a graphic sign, so as to allow for the selection and identification in a univocal manner the relevant new program, through the command means MZ and the display DY, respectively.

From the above description, the features of the present invention are clear, and also its advantages are clear.

From the above it is clear, in fact, how the electronic control system of the electric user according to the present invention has an appropriate hardware configuration or architecture and an appropriate control program for achieving the following functions:

Access, from the outside, to all information associated to the type and model of electric user, and to the information generated by the electronic control system of the latter during its operation; such information are adequately preserved in volatile and/or non volatile memory means (RAM; EEPROM, FLASH, ROM) of the same electronic control system; among these information, detailed historical information are particularly important, as they allow of having available a precise recording of the time progress or trend of the variables of status of the electric users, with reference to the last operation period.

Total remote control of the operation of the electric user performed by any external electronic apparatus capable of communicating with the control system of the electric user itself.

"Spontaneous" transmission, by the control system of the electric user, to the external environment of information associated to the occurrence of certain events, which are deemed to be important for the implications they can have in relation with the consumer's safety, the correct operation of the electric user and other specific purposes (for example, the end of a wash cycle running on a laundry washing machine).

Updating of the of the software of the control system of the electric user according to the following procedures:
  update of the value of the parameters associated to the basic modes of operation (cycles or programs) of the electric user;
  addition of new modes of operation (such as new cooking programs, new wash cycles, etc.).

It is clear that many changes are possible for the man skilled in the art to the household electric user with electronic control, and to the relevant control and programming system, described above by way of example, without departing from the novelty spirit of the inventive idea.

If required, for instance, also the updating of the content of the memory MP may be provided, if this is allowed by the electronic technology associated to the control system of the electric user. In particular, this operation would require that the memory MP containing the control program of the microcontroller MC be a Flash or EEPROM memory, and that the microcontroller itself has proper resources which allow for replacing said program through the communication channel with the external environment, which consists of the asynchronous serial line LS, as mentioned above.

The invention claimed is:

1. Household electric appliance, including an electronic control system comprising:
  a) an electronic microcontroller;
  b) program memory means, containing data which allow the control system to perform a certain number of basic programs of the appliance;
  c) means for sensing the operating conditions of the appliance and for generating variables which relate to the status of the appliance, where the variables relate to internal events, external events, user-selected functions, and measurements of the appliance;
  d) read and write nonvolatile memory means;
  e) means for automatically storing, within said nonvolatile memory means, detailed historical information indicative of said status variables during the last operation period of the appliance, the last stored information causing the elimination of the oldest ones; and
  f) communication means for making the stored information available from outside the appliance.

2. The appliance according to claim 1, wherein said historical information are associated with the occurrence of internal events to the appliance.

3. The appliance according to claim 2, wherein the internal events are faults and malfunctioning of the components of the appliance.

4. The appliance according to claim 1, wherein said historical information are associated with the occurrence of external events to the appliance.

5. The appliance according to claim 4, wherein the external event is a power supply blackout.

6. The appliance according to claim 1, wherein the appliance has continuous operation.

7. The appliance according to claim 6, wherein the continuous operation appliance is a refrigerator, a freezer, or a boiler.

8. The appliance according to claim 6, wherein said operation period is a predefined time span.

9. The appliance according to claim 8, wherein said predefined time span is a week, a day or the last twelve hours.

10. The appliance according to claim 1, wherein the appliance has discontinuous operation.

11. The appliance according to claim 10, wherein the appliance is a laundry washing machine, a cooking oven, or a dishwasher.

12. The appliance, according to claim 10, wherein said operation period is represented by a predefined number of operating cycles or programs performed by the appliance.

13. The appliance according to claim 1, wherein said historical information are made available through said communication means in a remote location, for executing a deep analysis of the appliance status.

14. The appliance according to claim 1, wherein the storing of the most recent information causes the elimination of the oldest ones through a backward shifting operation of the stored historical information.

15. Household electric appliance, including an electronic control system comprising:
   a) an electronic microcontroller;
   b) program memory means, containing data which allow the control system to perform a certain number of basic programs of the appliance;
   c) means for generating variables which relate to the status of the appliances where the variables relate to internal events, external events, user-selected functions, and measurements of the appliance;
   d) read and write nonvolatile memory means;
   e) means for automatically storing, within said nonvolatile memory means, detailed historical information indicative of said status variables during the last operation period of the appliance, the last stored information causing the elimination of the oldest ones; and
   f) communication means for making the stored information available from outside the appliance.

16. The appliance according to claim 15, wherein said historical information are associated with the occurrence of internal events to the appliance.

17. The appliance according to claim 16, wherein the internal events are faults and malfunctioning of the components of the appliance.

18. The appliance according to claim 15, wherein said historical information are associated with the occurrence of external events to the appliance.

19. The appliance according to claim 18, wherein the external event is a power supply blackout.

20. The appliance according to claim 15, wherein the appliance has continuous operation.

21. The appliance according to claim 20, wherein the continuous operation appliance is a refrigerator, a freezer, or a boiler.

22. The appliance according to claim 20, wherein said operation period is a predefined time span.

23. The appliance according to claim 22, wherein said predefined time span is a week, a day or the last twelve hours.

24. The appliance according to claim 15, wherein the appliance has discontinuous operation.

25. The appliance according to claim 24, wherein the appliance is a laundry washing machine, a cooking oven, or a dishwasher.

26. The appliance, according to claim 24, wherein said operation period is represented by a predefined number of operating cycles or programs performed by the appliance.

27. The appliance according to claim 15, wherein said historical information are made available through said communication means in a remote location, for executing a deep analysis of the appliance status.

28. The appliance according to claim 15, wherein the storing of the most recent information causes the elimination of the oldest ones through a backward shifting operation of the stored historical information.

* * * * *